UNITED STATES PATENT OFFICE.

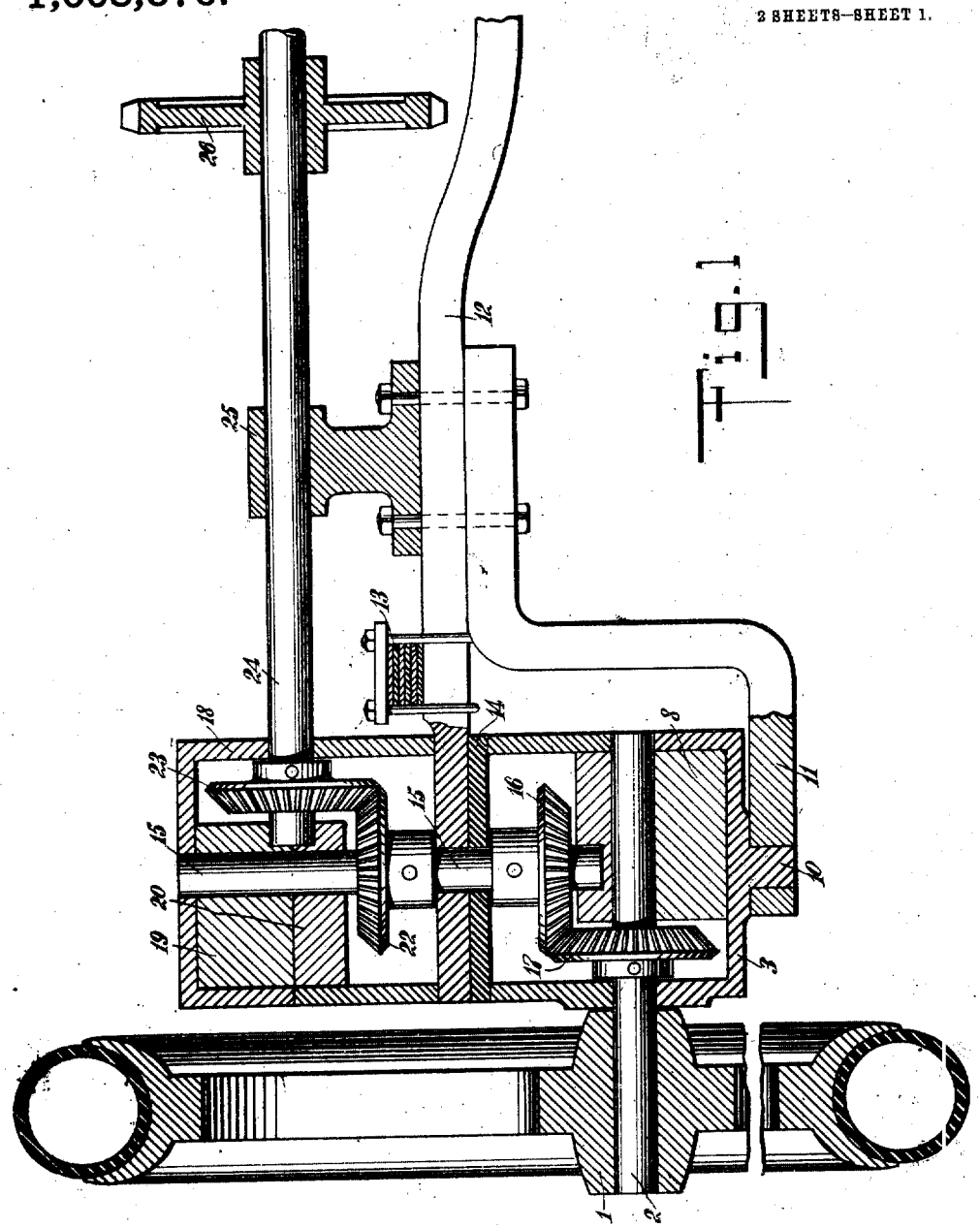

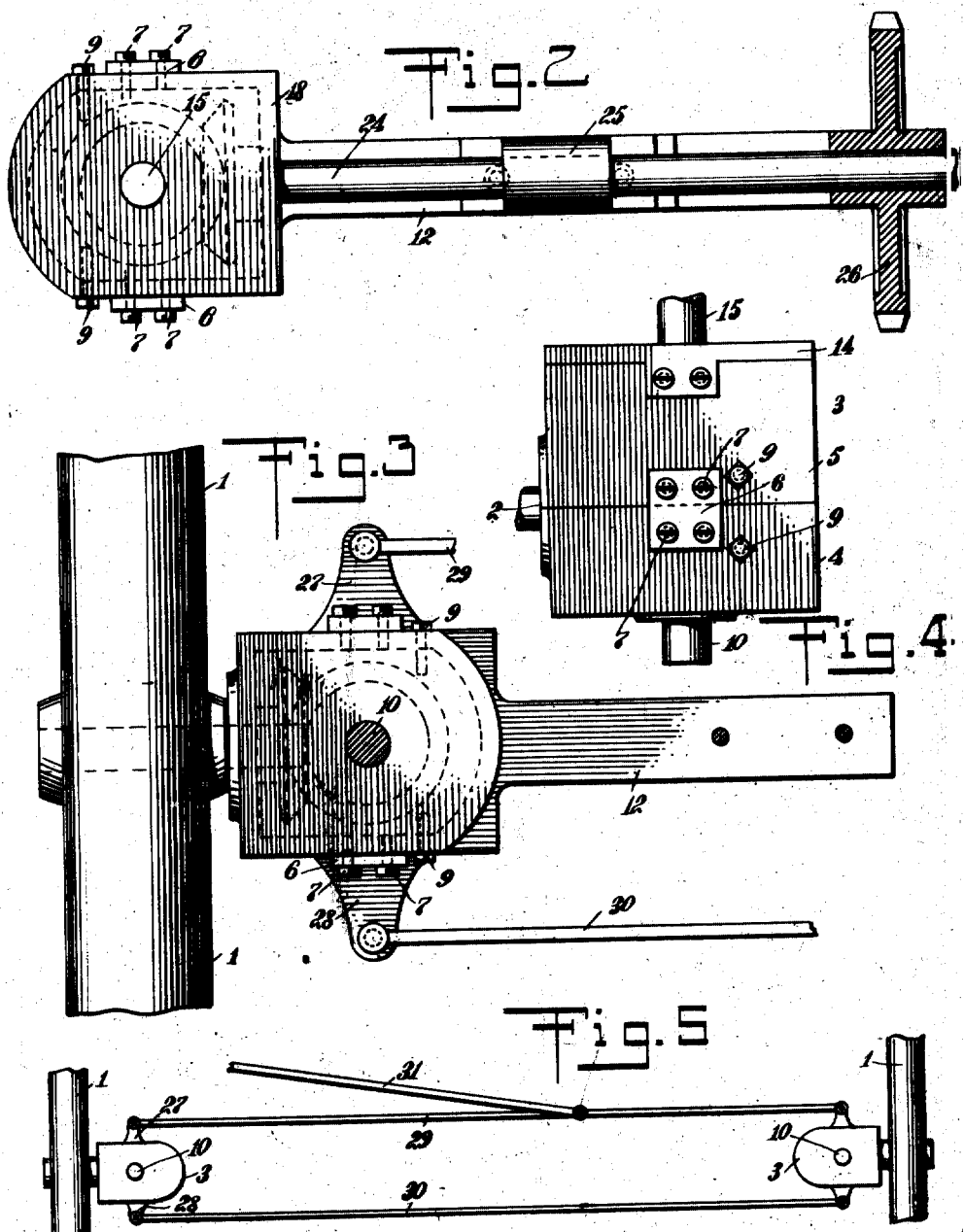

SAMUEL E. SIDERS, OF DELPHOS, KANSAS, AND GEORGE A. SIDERS, OF NOVINGER, MISSOURI.

COMBINED STEERING AND DRIVING MECHANISM.

1,008,376.     Specification of Letters Patent.     Patented Nov. 14, 1911.

Application filed October 26, 1909. Serial No. 524,657.

*To all whom it may concern:*

Be it known that we, SAMUEL E. SIDERS and GEORGE A. SIDERS, both citizens of the United States, and residents, respectively, of Delphos, in the county of Ottawa and State of Kansas, and of Novinger, in the county of Adair and State of Missouri, have invented a new and Improved Combined Steering and Driving Mechanism, of which the following is a full, clear, and exact description.

This invention relates to an improvement in motor vehicles, and particularly to the means for driving and steering the forward wheels thereof.

An object of this invention is to provide a device which will be simple in construction, strong, durable, and efficient and positive in its operation.

A further object of this invention is to provide a motor vehicle with front steering wheels, and with means for transmitting power to said wheels without interfering with their steering action.

A still further object of this invention is to provide gearing for motor vehicle wheels, which will drive and steer the same, and oil-tight casings whereby the driving gearing may be perfectly lubricated.

These and further objects, together with the construction and combination of parts, will be more fully described hereinafter and particularly set forth in the claims.

Reference is to be had to the accompanying drawings forming a part of this specification, in which similar characters of reference indicate corresponding parts in all the views, and in which—

Figure 1 is a vertical transverse section, showing the relation of the parts; Fig. 2 is a top plan view, partly in section, of the gearing casing and the driving connection to the same; Fig. 3 is a bottom plan view, with the supporting bracket broken away; Fig. 4 is a detail view of the lower gear casing; and Fig. 5 is a bottom plan view, showing the steering connections with the two front wheels.

Referring more particularly to the separate parts of the device, 1 indicates one of the forward wheels of the vehicle, which may be of any suitable form. The wheel 1 is secured in any well known manner, as by means of a key, to an axle 2. The axle 2 extends through an opening in a casing 3, which is preferably made oil-tight so as to contain a suitable lubricating oil. This casing 3 is formed in two parts 4 and 5, which divide along the line of the axle 2, as is more clearly illustrated in Fig. 4. These parts are connected and secured together by means of a clamp 6, which is secured on the parts 4 and 5 in any suitable manner, as by means of bolts 7. The axle 2 is journaled in the casing 3 and in a bushing 8, which is secured in the casing 3 by any suitable means, such as bolts 9. The bottom of the casing 3 is provided with a pivot shaft 10, which is journaled in and supported by a bracket 11, which in turn is supported on a cross member 12 on the front part of the frame. The cross member 12 is connected in any suitable manner to the body of the vehicle, as by means of springs 13. The member 12 rests on a movable cap 14 on the casing 3, and is supported thereby. The cap 14 is provided with an opening, which is in alinement with a similar opening in the member 12, and these openings form a suitable bearing for a vertical shaft 15 that extends down into the casing 3 and is provided with a step bearing in the bushing 8. The shaft 15 has a bevel gear 16 secured thereon, which meshes with a corresponding bevel gear 17 secured to the axle 2. The shaft 15 extends up above the member 12, into an oil-tight casing 18, and is journaled in bushings 19 and 20. That portion of the shaft 15 within the casing 18 is provided with a bevel gear 22, which meshes with a corresponding bevel gear 23, secured to a transverse power shaft 24, which is journaled in the casing 18 between the bushings 19 and 20. The power shaft 24 is further provided with a bearing 25, which is secured in any well known manner to the cross member 12. The shaft 24 is driven in any suitable manner, as by means of a chain which is connected to the motive power, and engages a sprocket wheel 26 secured on the shaft 24. Each of the lower gear casings 3, has secured to the sides thereof in any well known manner outstanding lugs 27 and 28, as is more clearly illustrated in Figs. 3 and 5. These lugs are pivotally connected by means of steering rods 29 and 30. The steering rod 29 is connected to the steering wheel by any suitable means, such as a connecting rod 31.

The operation of the device will be readily understood from the above description. By manipulating the rod 31 through a steering wheel (not shown) the parallel steering rods 29 and 30 will rotate the gear casings 3 on their pivots 10, thereby inclining the wheels 1 at an angle to the direction of the machine, causing it to change its direction. The wheels 1 are driven through the bevel gearing by the power shaft 24. Each operation is independent of the other, and by reason of this arrangement, they will not interfere with each other.

Having thus described our invention, we claim as new and desire to secure by Letters Patent:—

1. In a device of the class described the combination with a cross member of brackets depending from said cross member at each end thereof, oil casings rotatably supported on said brackets intermediate said cross member and said brackets, shafts journaled in said casings, wheels secured to said shafts, bevel gears on said shafts within said casings, bevel gears within said casings meshing with said first-mentioned bevel gears, oil casings mounted on said cross member, a driving mechanism in said second-mentioned oil casings for driving said second-mentioned bevel gear, means for driving said driving mechanism, lugs on said first-mentioned rotatable oil casings extending in opposite directions therefrom, and parallel steering rods connecting said lugs whereby said first-mentioned oil casings are adapted to be rotated to steer said wheels.

2. In a device of the class described, the combination with a frame, of an oil casing fixedly secured on said frame, an oil casing pivotally connected to said frame and located subjacent said first-mentioned oil casing, a vertical shaft extending into each of said casings, a bevel gear on each end of said shaft, one in each of said casings, and a pair of horizontal shafts projecting separately in opposite directions into said casings and having bevel gears meshing with said first-mentioned bevel gears, said casings being separated from each other and out of fluid communication with each other so that the one can move relative to the other.

3. In a device of the class described, the combination with a frame, of an oil casing fixedly secured on said frame, an oil casing located subjacent said first-mentioned oil casing and having a lug thereon whereby it is pivotally connected to said frame, a vertical countershaft extending into both of said casings, a bevel gear on the top and bottom ends of said shaft, one in each of said casings, a pair of horizontal shafts projecting separately into said separate casings and terminating therein, and bevel gears on said horizontal shafts, meshing with said first-mentioned bevel gears, whereby one of said horizontal shafts may be driven from the other of said horizontal shafts irrespective of any bodily relative movement of said horizontal shafts.

In testimony whereof I have signed my name to this specification in the presence of two subscribing witnesses.

SAMUEL E. SIDERS.

Witnesses:
F. B. PARTRIDGE,
J. B. RICHARDS.

In testimony whereof I have signed my name to this specification in the presence of two subscribing witnesses.

GEORGE A. SIDERS.

Witnesses:
JOHN TADE,
GEORGE BIGBEE.